(No Model.)　　　　　　　　　　　　　　　　4 Sheets—Sheet 1.
E. N. DICKERSON.
VALVE GEAR FOR STEAM ENGINES.

No. 502,878.　　　　　　　　　　Patented Aug. 8, 1893.

Witnesses:
Geo. W. Hiatt
D. W. Gardner

Inventor
Edw. N. Dickerson (No Model.)  4 Sheets—Sheet 2.

E. N. DICKERSON.
VALVE GEAR FOR STEAM ENGINES.

No. 502,878. Patented Aug. 8, 1893.

Witnesses:
Geo. W. Miatt
D. W. Gardner

Inventor:
Edw. N. Dickerson (No Model.)

E. N. DICKERSON.
VALVE GEAR FOR STEAM ENGINES.

No. 502,878. Patented Aug. 8, 1893.

(No Model.)

E. N. DICKERSON.
VALVE GEAR FOR STEAM ENGINES.

No. 502,878. Patented Aug. 8, 1893.

4 Sheets—Sheet 4.

UNITED STATES PATENT OFFICE.

EDWARD N. DICKERSON, OF NEW YORK, N. Y.

VALVE-GEAR FOR STEAM-ENGINES.

SPECIFICATION forming part of Letters Patent No. 502,878, dated August 8, 1893.

Application filed March 7, 1889. Serial No. 302,328. (No model.)

*To all whom it may concern:*

Be it known that I, EDWARD N. DICKERSON, of the city, county, and State of New York, have invented a new and useful Improvement in Cylinders and Valve-Gear of Steam-Engines, of which the following is a full, true, and correct description, reference being had to the accompanying drawings.

My invention is specially advantageous to locomotives where slide valves must be used; and its object is to increase the efficiency of such engines, by distributing and controlling the steam more in accordance with the laws under which it is capable of producing its best results than is done in engines as now constructed and operated, by increasing the endurance of the valves, and protecting the engine from the consequences of water caught in the cylinder.

The common method for using steam in a locomotive engine is by a single D valve, worked by Stevenson's link motion, in which one valve performs all the functions of admitting, cutting off, and exhausting the steam to and from the cylinder. This operation is attended by very large losses in wire-drawing the admitted and exhausted steam, and in suppressing the exhaust; so that the full value of the steam used cannot be developed, nor high speed obtained; while, at the same time, the valves wear out rapidly and lose much by leakage. The cylinders also retain any water which may exist in them to the last, and then it transmits a violent blow to the head; and if cinders are drawn in they escape with difficulty. All these difficulties are practically overcome by my improvements.

Figure 1:
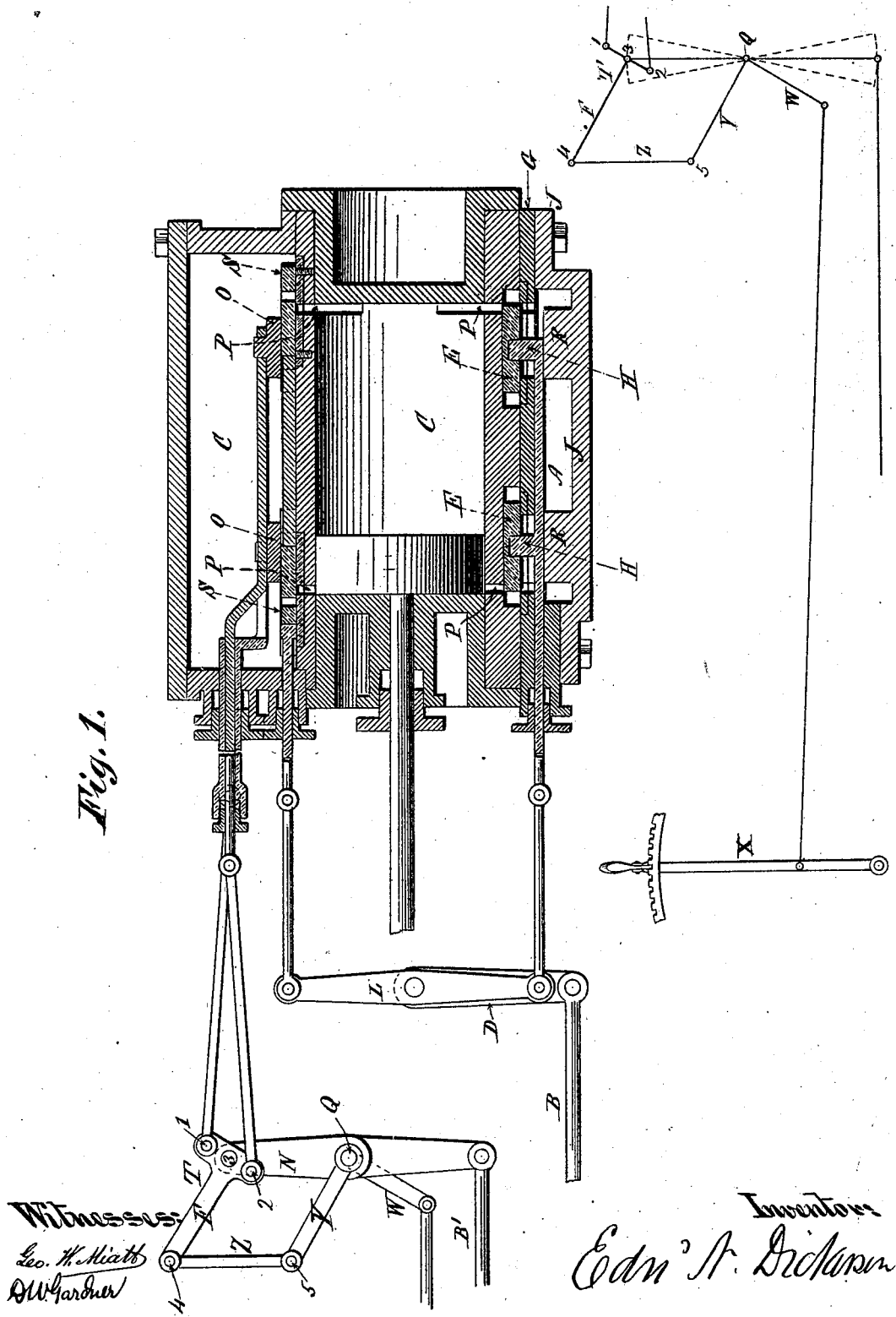
Figure 2:
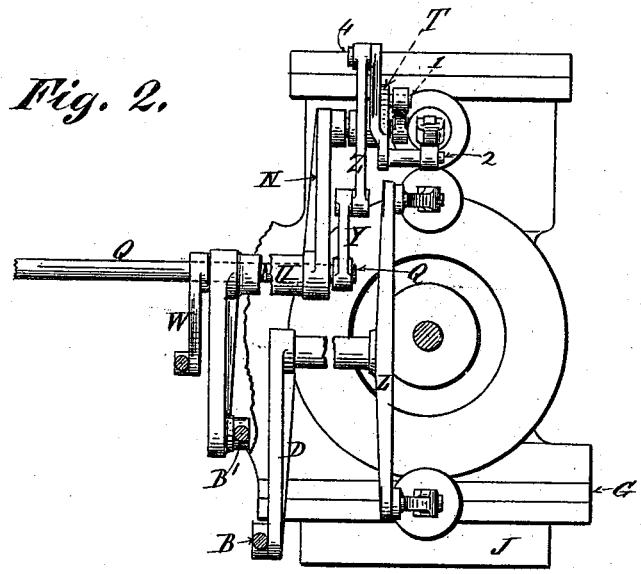
Figure 3:
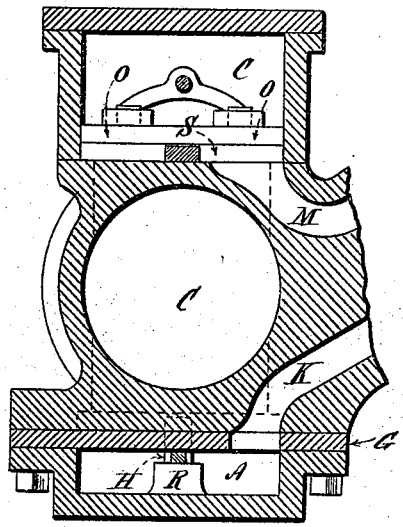
Figure 4:
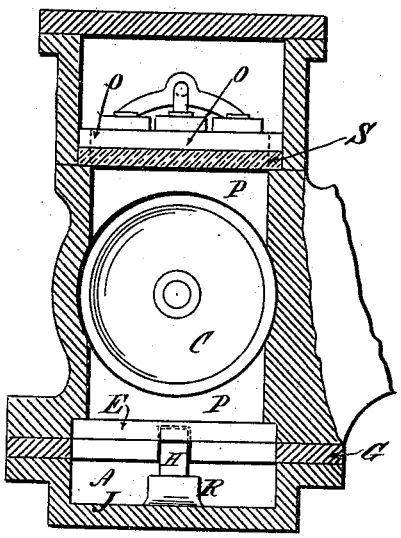
Figure 5:
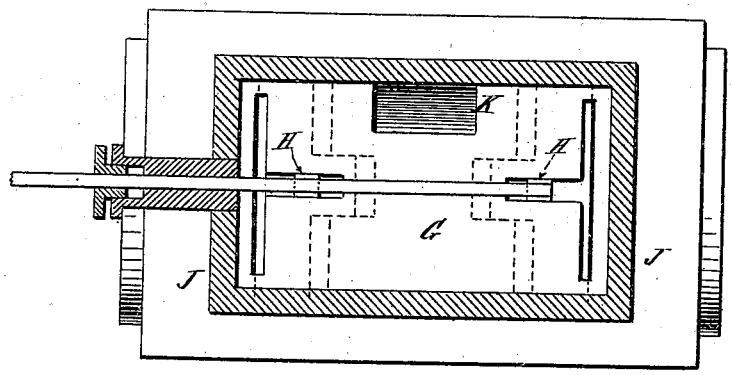
Figure 6:
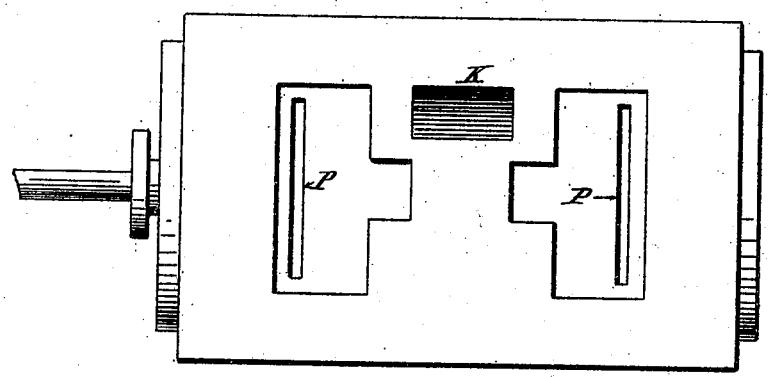
Figure 7:
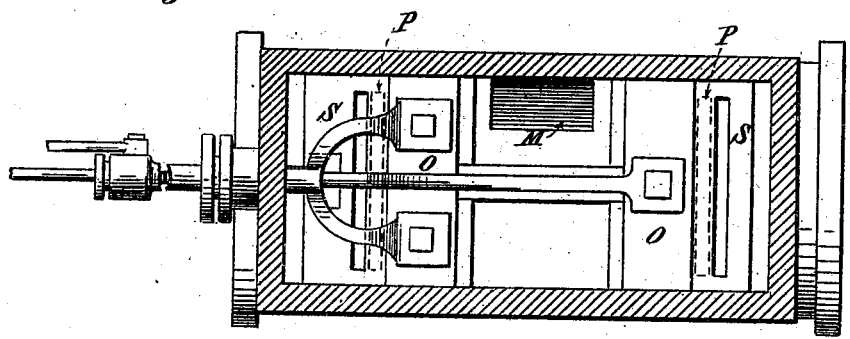

Figure 1, represents the entire apparatus, together with the geometry of the cut-off motion separately. The cylinder and valve gear are shown in section through the center of the cylinder. In this section the hooks H for working the exhaust valves are shown in the slots of the valve seats. Fig. 2, represents an end elevation of the cylinder, and of the two rock-shafts, with the cut-off regulator. Fig. 3, is a cross-section through the center of the cylinder, showing the steam and exhaust passages, the exhaust channel below the cylinder, the slide bearing R for the exhaust valve-stem, and the connecting yoke for the forward cut-off valve in the chest. The section below the letter S is the coupling bar between the two steam valves. Fig. 4, is a section through the cylinder at the forward ports, showing in elevation the connecting yokes to the cut-off valves, and the hooks of the exhaust valve stem by which the exhaust valves are operated, passing up into a mortise in the lower side of the exhaust valve through the slot in the valve seat, and supported by the rib in the lower cover. Fig. 5, is a horizontal section from beneath through the exhaust passage cover in the line of the valve stem, showing the ports through the plate which form the exhaust valve seats, and in dotted lines the T-shaped recess in the bottom of the cylinder, and the exhaust valves in position; together with the valve stem and its hooks passing up into the mortises in the exhaust valves. Fig. 6, shows the bottom of a cylinder with its T-shaped exhaust valve chambers recessed into it; the ports into the cylinder; and the exhaust passage K. The bottom of the cylinder is planed flat and the plate G is bolted onto it, making steam tight joints around the recesses. Fig. 7, is a top view of the cylinder with the steam and cut-off valves in place. The upper valves are the cut-off valves O; under them are the steam valves S, with their ports exposed to view; and under them are the ports into the cylinder in dotted lines. The valve stem is shown attached to one steam valve by a T-headed bolt which is the end of the valve stem, and the two valves are similarly connected. Of course they may be united to the valve stem, and to each other, by a yoke in the ordinary way. The pin connection on the hollow valve stem, outside of the cylinder, shows how the cut-off regulator is attached to the hollow valve stem.

In all the figures, C indicates the cylinder and steam chest; S the steam valves; O the cut-off valves; E the exhaust valves; P the ports for the admission and exhaust of the steam,—which are in the ends of the cylinder, and practically vertical, so as to make the clearance as small as possible. The valves themselves are plates of metal about an inch thick, and preferably made of chilled cast iron. The seats should be of the same material, fixed to the upper surface of the cylinder, and to the lower plate G of the exhaust valve chamber, in a way well known to engineers. By this method all the valves and seats are in separate pieces, and can be removed and ground by emery wheels if they are defaced in use, and replaced, or renewed. Other material may be used in this system for the valves; and the seats may be, as is usual, of the substance of the cylinder itself, which will not be so good as if made of chilled iron. The upper valve surface of the cylinder is flat, and can be planed off from end to end, and the valve seats can then be pinned on by screw bolts steam tight. The lower side of the cylinder has recesses cast in it T-shaped, as shown in Fig. 6, deep enough and wide enough, to admit the exhaust valves, and long enough to permit their required travel. The plate G, Figs. 1, 2, 3 and 4, bolted on from below, covers these exhaust valve recesses, while it also forms the seats for these valves, which seats may be chilled on the plate itself to the extent needed, or may be pinned fast to it, as shown in the drawings; or may be made in the usual way by planing and scraping the plate itself which supports the exhaust valves. When bolted fast to the cylinder around its edges, and across the center between the two recesses, it forms the exhaust valve chambers steam tight, into which the exhaust steam flows through the ports. The longitudinal slot at right angles to the exhaust port through the plate, permits the hooks H, connected with the exhaust valve stem, to enter the mortises made in the under side of the exhaust valves, by which they are driven. This stem has two of such hooks on it—one for each valve—and is supported by a rib R, made in the exhaust passage below on which it rides so as to keep it up to its work. As the exhaust valves are in the bottom of the cylinder, water, or any foreign matter in the cylinder, will be first expelled by the exhaust steam and therefore no injury can result from their presence.

The steam and exhaust valves are driven by the lever L, by which they are moved together in symmetrical motion. It may be made of unequal lengths on opposite sides of its center, so as to produce a different throw on the steam and exhaust valves; and if gridiron, or double ports are used, instead of single ones as shown in the drawings, it is desirable to make this difference. In the drawings the steam valves and cut-off valves are shown without the eccentrics which are supposed to drive them in the usual way by the eccentric rods B B'. Of course on a locomotive a reversing link motion of some kind is supposed to be used, and is so used to work the main valve eccentric rod B, but such link motion is only used for reversing purposes when the independent cut-off is used as shown. If desired to use this cylinder and main valve arrangement for producing a cut-off with a Stevenson link, or other similar device, the exhaust valves may be worked by an independent motion if desired, or in direct connection with the link, producing the same effect as with the ordinary D valve. A single cut-off eccentric is set as is usual for double slide cut-off valves, which is generally about at right angles to the forward motion steam valve eccentric, and in advance of it for going forward. On a locomotive when backing the cut-off is of no importance, and will be out of the way when set wide open for going ahead.

The steam valves and exhaust valves, as shown in the drawings, are so set in relation to each other by their connection with the lever, that the steam valve opens simultaneously with the closing of the exhaust valve at the same end of the cylinder, and there is a lap on the steam valves. The steam ports into the cylinder are also shown as parallelograms, as is usual; but of course these particulars can be varied by the constructor according to his judgment. The ports may be V-shaped on their front edges, as is well known.

The rocker shaft to which the lever L is attached may be worked in the usual way by an eccentric connected with the arm D, by a link or otherwise; or if desired to reduce the larger motion of the eccentric to a shorter motion on the valves, which would diminish the effect on the valves of any dislocation of the main shaft by wearing in the boxes, a long and short arm rocker shaft may be used, connected at its long end to the eccentric link motion, and at its short end to one end of the lever L by any of a number of ways obvious to an engineer.

Outside of and below the plate G is the exhaust channel A which receives and carries off the exhaust steam, and which is bolted up against the plate G, and is formed by the cover J. Out of this channel the steam escapes by the opening K into a passage in the saddle casting in a locomotive, or out of any desired opening for the purpose. The steam is admitted to the steam chest above through a similar passage M, as is common in locomotive work, and needs no particular description.

The problem of working and regulating double independent exhaust valves in a locomotive, so as to bring them under the absolute control of the engineer, just as the Stevenson link motion lever controls the point of cut-off, is solved in a perfectly practical way by my invention, and renders such valves available for this purpose; and this has never been done for a locomotive. What is needed is that the two cut-off valves may be spread apart, or drawn together, by a lever in the hands of the engineer while the engine is running, thereby similarly varying their respective relations to the ports through the steam valves; so that under all circumstances the points of cut-off on both ends of the cylinder will be practically the same. This I effect by the parallel motion apparatus T, shown in Figs. 1 and 2. The cut-off rocker shaft U has two arms as usual; one of these is connected to the eccentric motion, not shown, and the other carries the center pin of the cut-off regulator T. The center of the rocker shaft U is bored out, and through it the counter shaft Q is passed. In a locomotive this shaft reaches to both sides of the engine, as shown in Fig. 2, and is supported within the two cut-off rocker shafts. The cut-off regulator T has two pins on it, Nos. 1 and 2, Fig. 1; one on each side of, and vibrating around the supporting center pin 3, which is held by the bearing in the end of the rocker arm—all these pins being in the same line; and to each of these pins 1 and 2 one of the cut-off valves' stems is connected in the usual way. The regulator T has also a third pin 4 on the end of the arm F, whose position makes a large angle with the line passing through the center of the other three pins of T, and by the vibration of which their angular position to the horizontal is changed for the purpose of spreading or drawing together the cut-off valves in the chest. On the end of the counter shaft Q is another arm Y with a pin 5 near its end, at the same distance from the center of Q as the distance of the pin 4 is from the center pin 3 of T. These two pins 4 and 5 on the arms F and Y are connected together by a connecting rod Z, having eyes in its ends, whose length is the same as the distance between the centers of Q and 3, which is the length of the cut-off rocker arm N. To the counter shaft Q is keyed fast an arm W, to which a rod is attached leading into the cab of the locomotive, as shown in the sketch Fig. 1, in the usual way well known for locomotives, where it is attached to a lever X, such as usually employed for regulating the point of cut-off with the Stevenson link motion, or to any convenient form of regulating handle for the engineer to use for the purpose of regulating the point of cut-off. When connected in the manner described, and the machine is running, inasmuch as the rocker arm N is by its construction necessarily parallel to the rod Z, and the arm F is parallel to the arm Y, so long as the regulating lever is held fast no angular change can occur in the regulator F; and it will be moved to and fro by the vibration of the rocker arm to which it is centered without making any change whatever in the distance apart of the cut-off valves, while, at the same time, any change in the position of the lever in the hands of the engineer will spread or draw together those valves symmetrically, and so alter the point of cut-off on both ends of the cylinder alike.

The perfection of this apparatus requires the shaft Q to be concentric with the rocker shaft; but that is not essential to its practical operation. If the center of Q is lower or higher than the center of the rocker shaft, and in the same plane when the rocker is at the center of its stroke, there will be no distortion of the points of cut-off at the opposite ends of the stroke; but the cut-off valves will be constantly changing their distances from each other instead of remaining at a fixed distance, which is a disadvantage to the apparatus. If, however, the center of Q is moved laterally away from the vertical plane, the points of cut-off will not be symmetrical in any but one possible position, and if the center be carried to any considerable extent away from the center of the rocker a serious difficulty will be produced which will destroy the efficiency of the apparatus.

In using this valve gear to start the engine the cut-off lever is to be set at one end of its throw, so as to bring the valves as near together as the apparatus permits, in which situation no cut off will occur at all, or not till very late in the stroke. The reversing link lever being thrown into the forward notch for going ahead, and the throttle valve being opened, the engine will move; but when in motion the cut-off lever is to be set back till the desired point of cut-off is reached, and the throttle valve to be left wide open.

In running the speed is to be regulated by the position of the cut-off lever, giving longer or shorter points of cut off. By this method of use no wire drawing will occur upon the steam, and if the exhaust valves are set as in the drawings, there will be no cushion. The indicator card, under these circumstances, will have square corners at the admission end and the pressure line will be practically parallel to the atmospheric line till the cut-off valve shuts, when it will fall abruptly without wire drawing and show the true curve of expansion due to the conditions of the cylinder and the steam.

What I claim as my invention, and desire to secure by Letters Patent, is—

1. The combination in a steam cylinder having two independent steam and two independent exhaust ports, four independent valves controlling the passage of steam through said steam and exhaust ports, cut off valves moving across the steam valves, means for alternately opening and closing corresponding steam and exhaust valves, and the driving arm N, the cut off valve regulator T, pivoted thereupon at or about the middle of the cut off valve controlling arm and connected at its two ends with the cut off valve rods, and the parallel motion devices controlled from the shaft Q, substantially as described.

2. The combination in a steam cylinder having two independent steam and two independent exhaust ports, four independent slide valves controlling the passage of steam through said steam and exhaust ports, means for operating said valves, cut off valves and operating devices therefor, the latter consisting of the driving arm N, regulator T, stationary shaft Q, and the parallel motion devices controlled from said stationary shaft, substantially as described.

3. The combination in a steam cylinder having two independent steam, and two independent exhaust ports passing directly through the walls of the cylinder, and close to the ends thereof in diametrically opposite positions, four independent valves controlling the passage of steam to said steam and exhaust ports, cut off valves for cutting off the steam supply to the cylinder, independent connections for operating said cut-off valves, the driving arm N, the regulator T, pivoted thereto and connected at its two ends with the cut off valve rods, and the parallel motion devices controlled from the stationary shaft Q, substantially as described.

4. The combination in a steam engine of a steam cylinder having two steam slide valves, and two flat exhaust slide valves, said exhaust valves being approximately diametrically opposite the steam valves; a valve stem operating the two exhaust valves and projecting beyond the cylinder; a valve stem operating two steam valves and similarly projecting beyond the cylinder and at the same end thereof; and an operating lever one end thereof being connected with the steam valve rod, and the other with the exhaust valve rod, and itself pivoted at a point centrally of its connection with said steam and exhaust valve rods, substantially as described.

5. The combination with the steam cylinder provided with steam ports and valves and cut off valves, of the exhaust ports P, P, the flat sliding exhaust valves E, E, operated by a single exhaust valve stem, the plate G, having the exhaust valve ports, and supporting said exhaust valves and provided with an opening or openings for the passage of the connections from the exhaust valve rod which operates the exhaust valves, the casing J, outside of the said plate G, and containing an exhaust steam passage, and the driving arm N, for the cut off valves, the regulator pivoted to the said arm and connected at its ends with the cut off valve rods, and the parallel motion devices F, G, Y, controlled from the stationary shaft Q, substantially as described.

6. The combination in a steam engine of two sliding steam valves having passages therethrough, two cut off valves cutting off the steam passing through said passages and driven by two independent rods, the said rods being both connected to an external vibrating driving arm, and mechanism under control of the operator in the cab, which is carried upon said arm for adjusting the cut off valve with reference to each other during the operation of the engine, substantially as described.

7. The combination with the steam cylinder, of the flat sliding steam valves S, S, the cut off valves O, O, controlled by independent driving shafts, the driving arm N, and the additional arm pivoted thereon and connected to each of said driving rods, and the parallel motion devices constructed arranged and operated from the stationary shaft Q, substantially as described.

8. The combination in a steam engine, of a steam cylinder having two independent steam and two independent exhaust ports, four independent valves controlling the passage of steam through said steam and exhaust ports, means for operating the valves for the respective ports, cut off valves, the stationary shaft Q, the parallel motion devices and intermediate connections between the cut off valve rods, and the rod extending to the cab of the engine for controlling said cut off valves, substantially as shown and in the manner set forth.

9. In a steam engine the apparatus herein shown for simultaneously driving and adjusting two cut-off valves, which consists of the driving arm N, the cut-off valve regulator T pivoted thereupon at or about the middle off the cut-off valve controlling arm and connected at its two ends with the cut-off valve rods, and the parallel motion F Z Y controlled from stationary shaft Q, substantially as described.

10. In a steam engine the apparatus herein shown for simultaneously driving and adjusting two cut-off valves, which consists of the driving arm N, the cut-off valve regulator T pivoted thereupon at or about the middle of the cut-off valve controlling arm, and connected at its two ends with the cut-off valve rods, and the parallel motion F Z Y controlled from stationary shaft Q, and the arm W for operating said shaft Q and itself controllable by the engineer in the cab, substantially as described.

In testimony whereof I have signed my name to this specification in the presence of two subscribing witnesses.

EDWD. N. DICKERSON.

Witnesses:
H. CONTANT,
ANTHONY GREF.